Patented Dec. 15, 1942

2,304,820

UNITED STATES PATENT OFFICE 2,304,820

SUBSTITUTED MONOAMIDES OF ALIPHATIC DIBASIC ACIDS

William Edward Hanford, James Emory Kirby and David W. Woodward, Wilmington, Del., assignors to E. I. du Pont de Nemours & Company, Wilmington, Del., a corporation of Delaware No Drawing. Application October 24, 1939, Serial No. 301,070

9 Claims. (Cl. 260—471)

This invention relates to dye intermediates and more particularly to dye intermediates suitable for use in color photography.

This invention has as an object the preparation of dye intermediates useful for the production of dyes applicable to cloth, paper, leather and the like. Another and very important object is the preparation of dye intermediates suitable for use in photographic emulsions and capable of being processed by the processes known to the art to produce a colored image. Another important object is the preparation of soluble dye intermediates for use in photographic color developing solutions to form insoluble dyes in the photographic emulsion. Another object is the preparation of dye intermediates which are capable of further reaction to more complex dye intermediates which are themselves capable of coupling or condensing to form dyes. Other objects will appear hereinafter.

These objects are accomplished by the following invention which comprises amides of aliphatic dicarboxylic acids of at least six carbon atoms containing on one and only one amido nitrogen a color forming nucleus capable of reaction to form a dye as hereinafter disclosed.

The dye forming nuclei above mentioned are those which are capable of reaction with diazonium salts, aromatic nitroso compounds, or the oxidation products of photographic developers to form azo, indophenol, indoaniline, indamine, or azomethine dyes and the term "dye forming nucleus" is to be read in this sense.

The compounds of the present invention have the formula

wherein Ar is a monovalent organic radical having a structure suitable for the production of one or more of the following types of dyes, e. g.. azo, indoaniline, indophenol, indamine and azomethine dyes, R is an aliphatic, including cycloaliphatic, radical which may be straight or branched chain which may be hydrocarbon or contain ether oxygens, either in the chain or in the substituents on the chain and which contains at least four and preferably from six to twenty carbon atoms in the chain, and X is amido, hydroxyl, halogen or OR' in which R' is the radical R' of an organic hydroxyl compound R'OH esterifiable by acids, i. e., CO—X is a carboxyl group, or an ester, amide, or halide thereof.

The radical Ar in the above formula is a monovalent organic radical having a structure suitable for reaction with a diazonium salt, an aromatic nitroso compound, or an oxidation product of a photographic developer according to the methods of dye chemistry to form an azo, indoaniline, indamine, indophenol, or azomethine dye. Thus the Ar radical may contain a directive primary, secondary, or tertiary amino or a hydroxyl group or ether thereof, i. e., an amino nitrogen or an oxy oxygen on the aromatic nucleus, influencing a hydrogen or other readily replaceable substituent on the ring para or ortho to the directive group, and allowing the formation of azo, indamine, indophenol or indoaniline dyes wherein the —N=N— or the —N= group comes from the other component. The Ar radical may also contain an active methylene group which may be coupled with a diazonium salt or a nitroso compound. The nitroso compound or compounds may or may not be the photographic oxidation products of color developers. (See Cain & Thorpe—Synthetic Dyestuffs—Griffin, London, 1933, p. 132.) Diazonium salts and nitroso compounds have the formula

where A is oxygen in the nitroso compound and NB in the diazonium salt, B being the salt radical, i. e., the anion of an acid and Ar' is a monovalent aromatic radical. The Ar radical may include a diazotizable amino group which may be diazotized and coupled with an aromatic hydroxy compound or amine or compound containing an aromatic amine group. (See Fierz-David— Künstliche organische Farbstoffe—Springer, Berlin, 1926, pp. 87–204.) Such amine groups may be formed by reduction of a nitro group, azo groups, or by any other suitable method of organic chemistry. In general, the Ar radical is aromatic in nature and possesses aromatic amino or phenolic hydroxyl, or etherified phenolic hydroxyl groups, with replaceable hydrogen atoms or groups in the ortho and/or para position to them, or reactive methylene groups such as are known to enter the coupling reaction. All of the compounds of this invention will couple with diazotized aromatic or heterocyclic amines of the type used in preparing the well known azo dyes, or they will couple with the oxidation products of photographic developers such as the p-phenylenediamine and p-amino-phenol developers and their derivatives. In addition to the structure essential for condensation to dyes, the Ar radical may contain halogen atoms, alkyl, amyl, alkoxy, aralkyl, nitro, carboxylic or sulfonic acid groups as long as a coupling position is available for azo or nitroso coupling reactions.

The compounds of this invention may be synthesized in various ways. The preferred method is that of the condensation of a monochloride of an aliphatic dicarboxylic acid ester of the type Cl—CO—R—COOR' with an amine Ar—NH$_2$ where Ar has a structure as previously described and R and R' are as previously defined.

The ester group (—COOR') in the condensation products is capable of conversion to any one of a number of other derivatives of the acid such as to other ester groups, the free acid, amide, or acid halide. Methods for accomplishing these conversions are well known in organic chemistry and can be found in any of the common text books (see W. J. Hickinbottom, "Reactions of Organic Compounds," pp. 233–240 and 194–195).

The more detailed practice of the invention is illustrated by the following examples, wherein parts given are by weight. There are of course many forms of the invention other than these specific embodiments.

Example I

A solution of one hundred nine parts of ortho-aminophenol and 44 parts of powdered sodium hydroxide in 600 parts of ether is refluxed while 178 parts of the chloride of the monomethyl ester of adipic acid is added. The product is extracted with sodium hydroxide solution and precipitated with an excess of hydrochloric acid. The compound may be purified by distillation. It boils at 142° C. under 3 mm. pressure and is crystallized from ethanol. The resulting product, methyl N-ortho-hydroxyphenyl-adipamate, is a white crystalline solid melting at 59–61° C., analysing 5.60% nitrogen as compared with the theoretical 5.58% for $C_{13}H_{17}O_4N_2$ and having the following structure

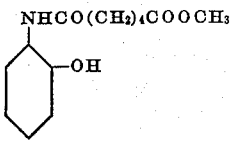

Twenty-five parts of this compound is added to 200 parts of boiling water containing 4 parts of sodium hydroxide and 20 parts of sodium carbonate. When the solution is complete it is cooled to room temperature. To this solution is added a solution prepared by diazotizing 14 parts of p-nitroaniline in 250 parts of 1-molar hydrochloric acid solution at 5° C. with 10 parts of 10-molar sodium nitrite solution. After 15 minutes of agitation the solution is neutralized with a mineral acid and the yellow dye removed by filtration. This dye has the following probable structure:

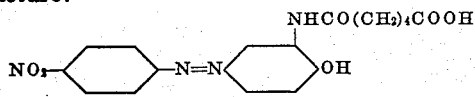

Example II

Methyl N-meta-hydroxyphenyladipamate is prepared similarly from meta-aminophenol. It is a white crystalline solid melting at 122–124° C. Calcd. for $C_{13}H_{17}O_4N_2$: N, 5.58%, found: N, 5.59%. The amide of this compound is prepared by shaking 25 parts of the ester in 200 parts of concentrated ammonia water for 24 hours. It is a white solid analyzing 11.6% nitrogen compared with the theory of 11.9% for $C_{12}H_{16}O_3N_2$.

Twenty-five parts of the above ester is added to 200 parts of boiling water containing 4 parts of sodium hydroxide and 20 parts of sodium carbonate. When the solids are all dissolved the solution is allowed to cool to room temperature. To this is added a solution prepared by diazotizing 23 grams of 1-naphthylamine-5-sulfonic acid in 250 parts of 1-molar hydrochloric acid solution at a temperature of 5° C. with 10 parts of 10-molar sodium nitrite solution. After 15 minutes of agitation, the solution is neutralized with a mineral acid and the orange dye is removed by filtration. This dye has the following probable structure:

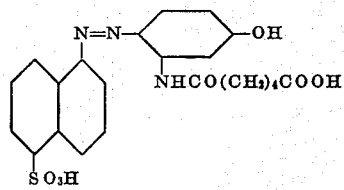

Example III

One hundred nine parts of meta-aminophenol is dissolved in 400 parts of dry pyridine and cooled at 5° C. At this temperature 178 parts of the chloride of monomethyl adipate is added with stirring. The mixture is stirred for one hour at room temperature and then poured into ice water, filtered and washed with cold water. The product is dissolved in boiling alcohol, and the solution treated with activated charcoal, filtered and cooled, whereupon a white product crystallizes out, melting at 127–129° C. The yield is 50% and the product is methyl N-meta-hydroxyphenyl-adipamate identical with that prepared in Example II. The ortho derivative may be prepared in the same manner.

Example IV

A photographic film bearing a latent silver halide image is developed in a p-aminodiethyl-aniline developer solution containing one-half part of N-meta-hydroxyphenyl-adipamic acid (prepared by hydrolysis of the methyl ester of Example II in 50% aqueous alcoholic potassium hydroxide) in 100 parts of developer. The film is then washed and the silver and silver halides removed in Farmer's reducer. The resulting film contains a blue indophenol dye image of the following probable structure:

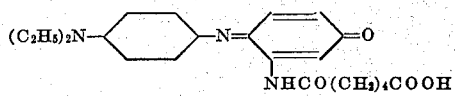

Example V

One hundred eighty-nine parts of 1-(meta-aminophenyl)-3-methyl-5-pyrazolone is dissolved in 1000 parts of pyridine and cooled to 5° C. at which temperature 178 parts of the chloride of monomethyl adipate is added slowly during one hour. The mixture is then stirred at room temperature for one hour and is then poured into a solution containing 1000 parts of concentrated hydrochloric acid, 500 parts of water and 1000 parts of ice. This mixture is extracted four times with a total of 1200 parts of ethyl acetate and the aqueous portion discarded. The ethyl acetate solutions are combined, concentrated to 400 parts, extracted twice with 200 parts of 10% sodium carbonate solution and these extractions combined and washed with 200 parts of ethyl acetate. The carbonate solution is then acidified with mineral acid and extracted three times with a total of 800 parts of ethyl acetate. The ethyl acetate extraction is then washed once with water, is dried and evaporated to an oil. This oil is dissolved in 200 parts of alcohol, boiled with activated charcoal and filtered. The product separates on cooling as white crystals which, when further purified, melt at 118–120° C. The yield is 37%. The product analyzed 61.0% carbon, 6.3% hydrogen and 11.49% nitrogen, the theory being 61.65% carbon, 6.35% hydrogen and 12.69% nitrogen for methyl N-meta-(3-methyl-5-ketopyrazyl)-phenyladipamate of the empirical formula $C_{17}H_{21}O_4N_2$, having the structure

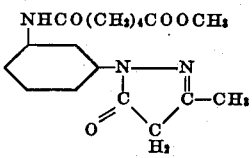

Example VI

In developing a film as in Example IV, one-half part of N-meta-(3-methyl-5-ketopyrazyl)-phenyladipamic acid, prepared by alkaline hydrolysis of the compound of Example V, is used in place of the m-hydroxy derivatives. The resulting film contains a magenta azomethine dye image. The dye has the following probable structure:

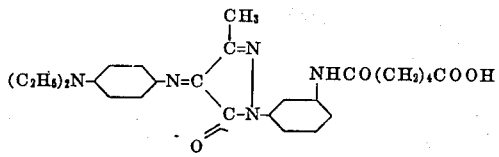

Example VII

Twenty-seven and six-tenths parts of para-nitroaniline and 10 parts of sodium hydroxide are stirred with 300 parts of ether at 5° C. while 36 parts of the chloride of monomethyl adipate is added during one hour. The mixture is then refluxed for one hour, cooled and filtered. The product is stirred 3 times with a total of 1000 parts of water and finally dissolved in 500 parts of ethyl acetate. This solution on evaporation deposits, in 72% yield, bright orange crystals melting at 193–194° C., analyzing 9.7% nitrogen as compared with the 10.0% of the theory for methyl N-para-nitrophenyladipamate of the empirical formula $C_{13}H_{16}O_5N_2$ and structural formula

The free acid is obtained by hydrolysis in alcoholic sodium hydroxide solution. It is a light-orange solid decomposing at 160–167° C., analyzing 10.39% nitrogen as compared with the 10.57% of theory for $C_{12}H_{14}O_5N_2$.

Example VIII

Twenty-six parts of the N-para-nitrophenyladipamic acid prepared as in Example VII is dissolved in 120 parts of glacial acetic acid at 80° C. and 20 parts of powdered zinc dust is added slowly. After the zinc is dissolved, the mixture is poured into 700 parts of 10% sodium hydroxide solution at 0° C. and filtered. The product is recrystallized from 200 parts of 50% alcohol. Ten parts of this product, N-para-aminophenyladipamic acid, is dissolved in 100 parts of 10% hydrochloric acid at 5° C. and diazotized with sodium nitrite solution until a slight excess of nitrous acid is present. The solution is then poured into a solution of 80 parts of sodium-beta-naphtholate in 100 parts of 5% sodium carbonate solution at 5° C. On neutralization the orange-red azo dye of the following structure is precipitated:

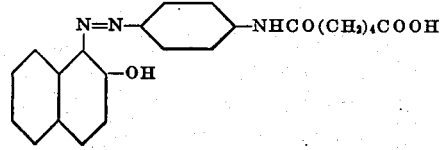

Example IX

A solution of 39 parts of para-aminoazobenzene in 200 parts of pyridine is cooled to 0° C. and stirred while 39 parts of the chloride of monomethyl adipate is added. The mixture is then stirred for one hour at 30° C. and poured into ice water containing 200 parts of concentrated hydrochloric acid. The product is washed, filtered and dried. After two crystallizations from alcohol it forms shining orange-yellow flakes melting at 160–161° C., yield 65%. Calcd. for $C_9H_{21}O_3N_3$: N, 11.75%. Found: N, 12.04%. The product, methyl N-p-phenylazophenyladipamate, has the following structure:

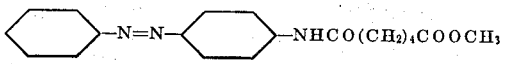

N-para-phenylazophenyladipamic acid (33 parts) may be reduced with zinc dust (14 parts) as in Example VIII to N-para-aminophenyladipamic acid, diazotized, and coupled as in Example VIII to the same azo dye.

Example X

Twenty-five parts of N-p-aminophenyladipamic acid prepared by the method of Example VIII is dissolved in 100 parts of anhydrous monochlorobenzene in a reaction vessel and heated to the boiling point of the solution while 11 parts of ethyl acetoacetate is added. After the alcohol has distilled, the solvent is evaporated under reduced pressure and the N-p-acetoacetaminophenyladipamic acid is dissolved in 200 parts of 5% sodium hydroxide, acidified, filtered and recrystallized from alcohol. It has the following structure:

Thirty-two parts of this compound is added to 200 parts of boiling water containing 4 parts of sodium hydroxide and 20 parts of sodium carbonate. When the solid is all dissolved, the solution is cooled to room temperature. To this is added a solution prepared by diazotizing 14 parts of p-nitroaniline in 250 parts of 1-molar hydrochloric acid solution at 5° C. with 10 parts of 10-molar sodium nitrite solution. After 15 minutes of agitation, the solution is neutralized with a mineral acid and the yellow dye removed by filtration. This dye has the following probable structure:

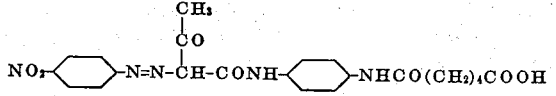

Example XI

A solution of 23 parts of the hydrochloride of p-aminoacetoacetanilide in 100 parts of pyridine is stirred at 5° C. while 20 parts of the chloride of monomethyl adipate is added. The mixture is then stirred at 30° C. for one hour and poured into 1000 parts of ice water containing 200 parts of concentrated hydrochloric acid. The precipitate is removed and recrystallized several times from alcohol to give a white crystalline solid, methyl N-p-acetoacetaminophenyladipamate.

Example XII

In a process similar to that of Example IV, one-half part of N-p-acetoacetaminophenyladipamic acid is used in place of the m-hydroxy derivative. The resulting film contains a yellow azomethine dye image. The dye has the following probable structure:

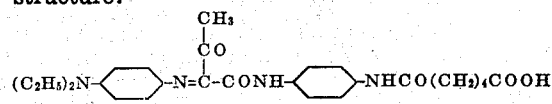

In place of the specific aromatic amino developing agents described in the preceding examples may be substituted various other specific agents of this type. These agents have an unsubstituted amino group which apparently enables the oxidation product to couple with the color-forming compound. Such agents include the mono-, di-, and tri-amino aryl compounds in which one amino group is in the ortho or para position to another amino group and the compounds formed therefrom by substitution in the amino group as well as in the ring. Thus, halogen, alkyl, alkoxy and aryl groups may be present.

The preferred developing agents in the process of dye coupling development are derivatives of p-phenylenediamine and particularly the asymmetric dialkyl p-phenylenediamines, e. g., p-aminodimethylaniline, p-aminodiethylaniline, p-aminodibutylaniline, etc. Other developing agents which may be used include p-phenylenediamine itself, p-methylaminoaniline, p-ethylaminoaniline and p-aminophenol, N,N-diethyl-o-phenylenediamine, chloro-p-phenylenediamine, 1,2,5-toluylenediamine, 2-amino-5-diethylaminotoluene, N-p-aminophenylpiperidine, N-methyl-N-hydroxyethyl-p-phenylenediamine, N-butyl-N-hydroxyethyl-p-phenylenediamine, 2-amino-5(N-butyl-N-hydroxyethylamino)toluene and its dihydrochloride, β-γ-dihydroxypropyl-p-phenylenediamine, etc. These aromatic amino-developing agents in the form of their organic or inorganic acid salts may be used in preparing the developing solutions. The salts are in general more stable than the free bases. As examples of suitable salts mention is made of the hydrochloride, sulfates, acetates, etc.

Example XIII

A solution of 16 parts of 5-amino-1-naphthol and 10 parts of pyridine in 200 parts of benzene is stirred at 10° C. while 18 parts of the chloride of monomethyl adipate is added during one-half hour. The temperature is then raised to 30° C. for one hour. The benzene solution is washed with water and extracted with sodium hydroxide solution which, on neutralization, deposits a white solid which may be recrystallized from alcohol. The product is methyl N-5-hydroxy-1-naphthyladipamate of the following structure:

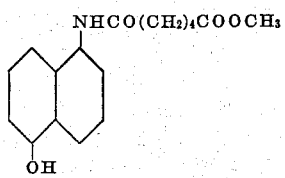

Thirty parts of this compound is added to 200 parts of boiling water containing 4 parts of sodium hydroxide and 20 parts of sodium carbonate. When the solid is all dissolved, the solution is cooled to room temperature. To this is added a solution prepared by diazotizing 14 parts of p-nitroaniline in 250 parts of 1-molar hydrochloric acid solution at 5° C. with 10 parts of 10-molar sodium nitrite solution. After 15 minutes of agitation the solution is neutralized with a mineral acid and the purple azo dye is removed by filtration. This dye has the following probable structure:

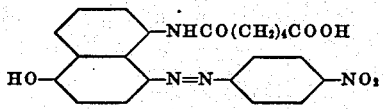

Example XIV

Eleven parts of m-aminophenol and 100 parts of pyridine are stirred together at 5° C. while 26 parts of the chloride of monomethyl sebacate is added. The solution is warmed to 50° C. for one-half hour, then poured into 500 parts of ice water and 200 parts of concentrated hydrochloric acid. The precipitate is filtered and washed repeatedly with water, then crystallized twice from alcohol to give a pure white product, methyl N-m-hydroxyphenylsebacamate of the following structure:

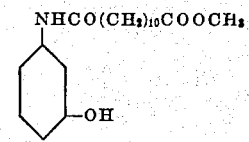

This may be reacted by the methods of Examples I and II with dye intermediates such as diazotized p-nitraniline or diazotized 1-naphthylamine-5-sulfonic acid to form azo dyes.

Example XV

Eleven parts of m-aminophenol is dissolved in a mixture of 100 cc. of dioxan and 50 parts of pyridine. The solution is stirred at 5° C. while 34 parts of the chloride of monomethyl tetradecanedioate is added. The mixture is stirred at 50° C. for two hours and poured into 500 parts of ice water and 200 parts of concentrated hydrochloric acid. The product is filtered and washed repeatedly with water, then crystallized twice from alcohol to give a pure white solid, methyl N-m-hydroxyphenyl-tetradecandioamate. This may be reacted by the methods of Example I and II with dye intermediates such as diazotized p-nitraniline or diazotized 1-naphthylamine-5-sulfonic acid to form azo dyes.

In the preparation of these compounds, the nucleus, Q, of the amine, QNH₂, used in the previously described condensations may be obtained from a non-coupling radical which is capable of conversion, through simple reactions, to a coupling nucleus. For instance the compound may contain a nitro (—NO₂) group (Example VII), or an azo (—N=N—Ar) group (Example IX) which may be reduced to amine groups (Examples VII, IX). Compounds containing free amine groups may be used as coupling components, diazotized and used as diazo components (Example VIII) condensed with a beta-keto ester such as ethyl acetoacetate to form compounds with active methylene groups (Example X) or converted to hydrazines and condensed with beta-keto esters to form the pyrazolone derivative which is a coupling component. These amine groups may also be replaced by hydroxyl groups through the customary reactions of diazotization and hydrolysis or they may be alkylated to form the secondary and tertiary amines.

The dye-forming nucleus, Ar, may contain such solubilizing groups as the carboxyl (—COOH) or sulfonic (—SO₃H) but lacking these they may be introduced into the dye-forming nucleus of the final mono-amide coupling component by the common techniques used in sulfonation and carboxylation. Thus this invention is of widest possible application making it possible to prepare any coupling component of the above general formula and containing the widest possible selection of substituents as long as a position remains available for the coupling reactions.

In the preferred process phase wherein an aliphatic dicarboxylic acid monoester monohalide is reacted with an aromatic compound having an amino group available for amide formation, the reaction is carried out at a temperature of 0° to 100° C. and at atmospheric pressure, molecular equivalents of reactants being used.

The condensation of the ester chloride of the aliphatic dicarboxylic acid to form the amides of the present invention is conveniently effected in a liquid medium. A number of media are available for effecting the condensation of the aromatic amine and the ester chloride of the dibasic acid, and the proper medium for the particular reaction is determined by a consideration of the reactivity and solubility of the reactants and ease of isolation of the product. The condensation is preferably carried out in inert solvents, e. g., liquid hydrocarbons, chlorinated hydrocarbons and ethers, in the presence of solids or liquids capable of removing hydrogen chloride from the reaction. Such agents include the alkali and alkaline earth hydroxides, carbonates, phosphates, etc., or their aqueous solutions and tertiary amines, e. g., pyridine, quinoline, triethylamine, dialkylanilines, and tetramethylethylenediamine, or similarly constituted compounds.

The compounds of the present invention are very useful in photographic processes and in the preparation of polyamide coupling components of the type described in copending patent application, Serial Number 301,041, filed of even date herewith. The alkali soluble lower members of this class, i. e., those containing a free carboxyl or sulfo group and not more than 10 carbon atoms are valuable constituents of color development solutions as, while they are alkali soluble, the dyes that may be produced from them during development are only sparingly soluble and are not readily removed from the films. Further, members of this new class of coupling component containing alkyl chains of at least four carbon atoms may be converted to valuable azo dyes which are especially suited for dyeing such fibers as wool in good shades which are fast to washing and fulling. Alternately, with a proper choice of constituents, as for example, by the preparation of components of the type containing sulfonic acid groups which yield water-insoluble metal sulfonates, water-insoluble dyes may be prepared which are advantageously used in the preparation of azo pigments and rubber colors. Many of the dyes produced in this manner impart a waterproofing effect to textiles.

The term "aliphatic" includes "cycloaliphatic" within its scope.

The above description and examples are intended to be illustrative only. Any modification of or variation therefrom which conforms to the spirit of the invention is intended to be included within the scope of the claims.

What is claimed is:

1. An amide of the formula

wherein Y—Ar— is an aromatic radical reactive with a diazonium salt to give an azo dye, containing hydrogen attached to nuclear carbon and activated by a group, Y, attached to nuclear carbon, of the class consisting of hydroxyl, alkoxyl, amino and alkylamino groups, R is a polymethylene radical of at least four carbon atoms and X is a member of the class consisting of carboxylic hydroxyl and lower alkyl esters thereof.

2. An amide according to claim 1 wherein R is the tetramethylene—(CH₂)₄—radical.

3. Process for producing dye intermediates which comprises heating to reaction temperature a monohalide mono lower alkyl ester of an aliphatic dicarboxylic acid having, between the carboxyl groups, a polymethylene radical of at least four carbon atoms with an aromatic amino compound Y—Ar—NH₂, wherein Y—Ar— is an aromatic radical bearing hydrogen reactive with a diazonium salt to give an azo dye, said hydrogen being attached to nuclear carbon and activated by a group, Y, attached to nuclear carbon, of the class consisting of hydroxyl, alkoxyl, amino and alkylamino groups attached to aromatic carbon.

4. Process of claim 3 wherein the monohalide monoester is the acid chloride of monomethyl adipate.

5. Methyl N-meta-hydroxyphenyladipamate

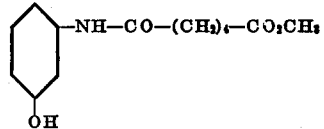

6. Methyl N-5-hydroxy-1-naphthyladipamate

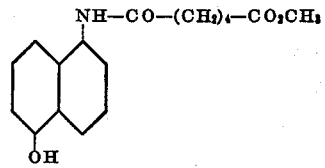

7. N-p-Aminophenyladipamic acid

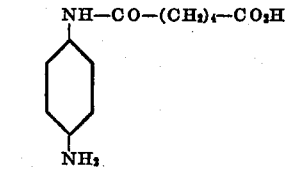

8. An alkyl ester of a monoamide of a dicarboxylic acid of the formula

where A is a bivalent aromatic hydrocarbon radical, B is a polymethylene radical of at least four carbon atoms, and D is a lower alkyl radical.

9. A monoamide of a dicarboxylic acid, said amide having the formula

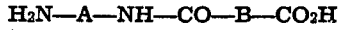

where A is a polymethylene radical and B is a bivalent aliphatic hydrocarbon radical of at least four carbon atoms.

WILLIAM EDWARD HANFORD.
JAMES EMORY KIRBY.
DAVID W. WOODWARD.